US 11,470,994 B2

(12) United States Patent
Hashimoto (10) Patent No.: US 11,470,994 B2
(45) Date of Patent: Oct. 18, 2022

(54) BEVERAGE SUPPLYING APPARATUS

(71) Applicant: FUJI ELECTRIC CO., LTD., Kawasaki (JP)

(72) Inventor: Masami Hashimoto, Yokkaichi (JP)

(73) Assignee: FUJI ELECTRIC CO., LTD., Kawasaki (JP)

( * ) Notice: Subject to any disclaimer, the term of this patent is extended or adjusted under 35 U.S.C. 154(b) by 896 days.

(21) Appl. No.: 16/256,645

(22) Filed: Jan. 24, 2019

(65) Prior Publication Data

US 2019/0239677 A1   Aug. 8, 2019

(30) Foreign Application Priority Data

Feb. 6, 2018   (JP) .............................. JP2018-019547

(51) Int. Cl.
*A47J 31/40* (2006.01)
*B67D 1/00* (2006.01)
*B01F 23/232* (2022.01)
*B01F 25/10* (2022.01)
*B67D 1/08* (2006.01)
(Continued)

(52) U.S. Cl.
CPC ............ *A47J 31/40* (2013.01); *B01F 23/232* (2022.01); *B01F 25/103* (2022.01); *B01F 25/1041* (2022.01); *B67D 1/0046* (2013.01); *B01F 23/23765* (2022.01); *B67D 1/0882* (2013.01); *B67D 1/1252* (2013.01); *B67D 2001/0093* (2013.01)

(58) Field of Classification Search
CPC ...... A47J 31/40; B67D 1/0046; B01F 5/0071; B01F 3/0446; B01F 5/0065; A45D 200/058; A61C 5/64
USPC ............................................ 222/145.5, 145.1
See application file for complete search history.

(56) References Cited

U.S. PATENT DOCUMENTS 9,386,782 B2 *   7/2016   Choi ...................... A47J 31/44
9,980,601 B2     5/2018   Feijen et al.
10,327,578 B2    6/2019   van Druten et al.
(Continued)

FOREIGN PATENT DOCUMENTS

CN     2287874 Y    8/1998
CN   200954047 Y   10/2007
(Continued)

OTHER PUBLICATIONS

Japan Patent Office, "Office Action for Japanese Patent Application No. 2018-019547" dated Nov. 9, 2021.
(Continued)

*Primary Examiner* — Vishal Pancholi
*Assistant Examiner* — Robert K Nichols, II
(74) *Attorney, Agent, or Firm* — Manabu Kanesaka (57) ABSTRACT

A beverage supplying apparatus that supplies a beverage into a beverage container, includes: an ingredient storage unit to store a beverage ingredient; a compressed gas supplying means to supply compressed gas to the ingredient storage unit and pressurize the beverage ingredient; and a beverage supplying means to, when receiving a supply command, allow the pressurized beverage ingredient to be supplied to a nozzle, and supply compressed nitrogen gas to the nozzle, so that the nitrogen gas and the beverage ingredient are mixed and stirred at the nozzle and the beverage is discharged to the beverage container through the nozzle.

7 Claims, 7 Drawing Sheets

(51) Int. Cl.
*B67D 1/12* (2006.01)
*B01F 23/237* (2022.01)

(56) References Cited

U.S. PATENT DOCUMENTS

| | | | |
|---|---|---|---|
| 10,477,883 B2 * | 11/2019 | Giardino | B01F 23/231 |
| 10,486,953 B2 | 11/2019 | Pellaud et al. | |
| 10,524,609 B2 | 1/2020 | Schuh et al. | |
| 2014/0272019 A1 | 9/2014 | Schuh et al. | |
| 2015/0182061 A1 | 7/2015 | Feijen et al. | |
| 2015/0289710 A1 | 10/2015 | van Druten et al. | |
| 2017/0240400 A1 | 8/2017 | Pellaud et al. | |
| 2018/0098658 A1 * | 4/2018 | Angell | A47J 31/44 |
| 2020/0138232 A1 | 5/2020 | Schuh et al. | |

FOREIGN PATENT DOCUMENTS

| | | |
|---|---|---|
| CN | 104411220 A | 3/2015 |
| CN | 104853655 A | 8/2015 |
| CN | 105102369 A | 11/2015 |
| CN | 107074517 A | 8/2017 |
| EP | 1639925 A2 | 3/2006 |
| JP | 2010-273744 A | 12/2010 |
| JP | 2016-059372 A | 4/2016 |
| WO | 2015/175244 A2 | 11/2015 |
| WO | 2017/179628 A1 | 10/2017 |

OTHER PUBLICATIONS

China National Intellectual Property Administration, "Office Action for Chinese Patent Application 201910093318.1," dated Sep. 29, 2021.

China National Intellectual Property Administration, "Office Action for Chinese Patent Application 201910093318.1," dated Apr. 24, 2022.

China National Intellectual Property Administration, "Search Report for Chinese Patent Application 201910093318.1," dated Apr. 18, 2022.

* cited by examiner

BEVERAGE SUPPLYING APPARATUS

CROSS-REFERENCE TO RELATED APPLICATION(S)

The present application claims priority to and incorporates by reference the entire contents of Japanese Patent Application No. 2018-019547 filed in Japan on Feb. 6, 2018.

BACKGROUND

The present disclosure relates to a beverage supplying apparatus.

In the related art, a beverage supplying apparatus that supplies a beverage into a beverage container has been proposed in Japanese Laid-open Patent Publication No. 2016-059372. In this beverage supplying apparatus proposed in Japanese Laid-open Patent Publication No. 2016-059372, a coffee beverage is left pressurized with compressed nitrogen gas, and when a supply command is given, the pressurized coffee beverage is fed to a nozzle, and the coffee beverage is discharged into a beverage container through the nozzle. Thereafter, by an operation of a switch lever provided at the nozzle, foam is generated from the coffee beverage (the pressurized coffee beverage) that has been fed to the nozzle, and the foam is discharged into the beverage container. Thereby, a nitro coffee beverage having the foam placed on the coffee beverage is supplied into the beverage container. A nitro coffee beverage supplied into a beverage container as described above is known to have smooth taste.

The foam is generated from the pressurized coffee beverage by the operation of the switch lever in the above described beverage supplying apparatus, but this generation of the foam is influenced by the amount of nitrogen gas dissolved in the coffee beverage, that is, the nitrogen content in the coffee beverage.

Therefore, with the above described beverage supplying apparatus where a coffee beverage is left pressurized with nitrogen gas, the nitrogen content in the coffee beverage is not stabilized, variation is caused in the appearance and flavor, and thus the quality of the beverage supplied by the beverage supplying apparatus may be not stabilized.

International Patent Application No. WO2015/175244 discloses a beverage dispensing system, in which coffee beverage and N2 or Co2 gas are mixed and the mixture is supplied. However, it is necessary for the beverage dispensing system to include a liquid/gas contactor membrane in order to mix the coffee beverage and N2 or Co2 gas.

SUMMARY

There is a need for providing a beverage supplying apparatus that enables quality of a beverage supplied into a beverage container to be stabilized.

According to an embodiment, a beverage supplying apparatus that supplies a beverage into a beverage container, includes: an ingredient storage unit to store a beverage ingredient; a compressed gas supplying means to supply compressed gas to the ingredient storage unit and pressurize the beverage ingredient; and a beverage supplying means to, when receiving a supply command, allow the pressurized beverage ingredient to be supplied to a nozzle, and supply compressed nitrogen gas to the nozzle, so that the nitrogen gas and the beverage ingredient are mixed and stirred at the nozzle and the beverage is discharged to the beverage container through the nozzle.

DETAILED DESCRIPTION

Hereinafter, with reference to the accompanied drawings, a preferred embodiment of a beverage supplying apparatus according to the present disclosure will be described in detail.

Figure 1:
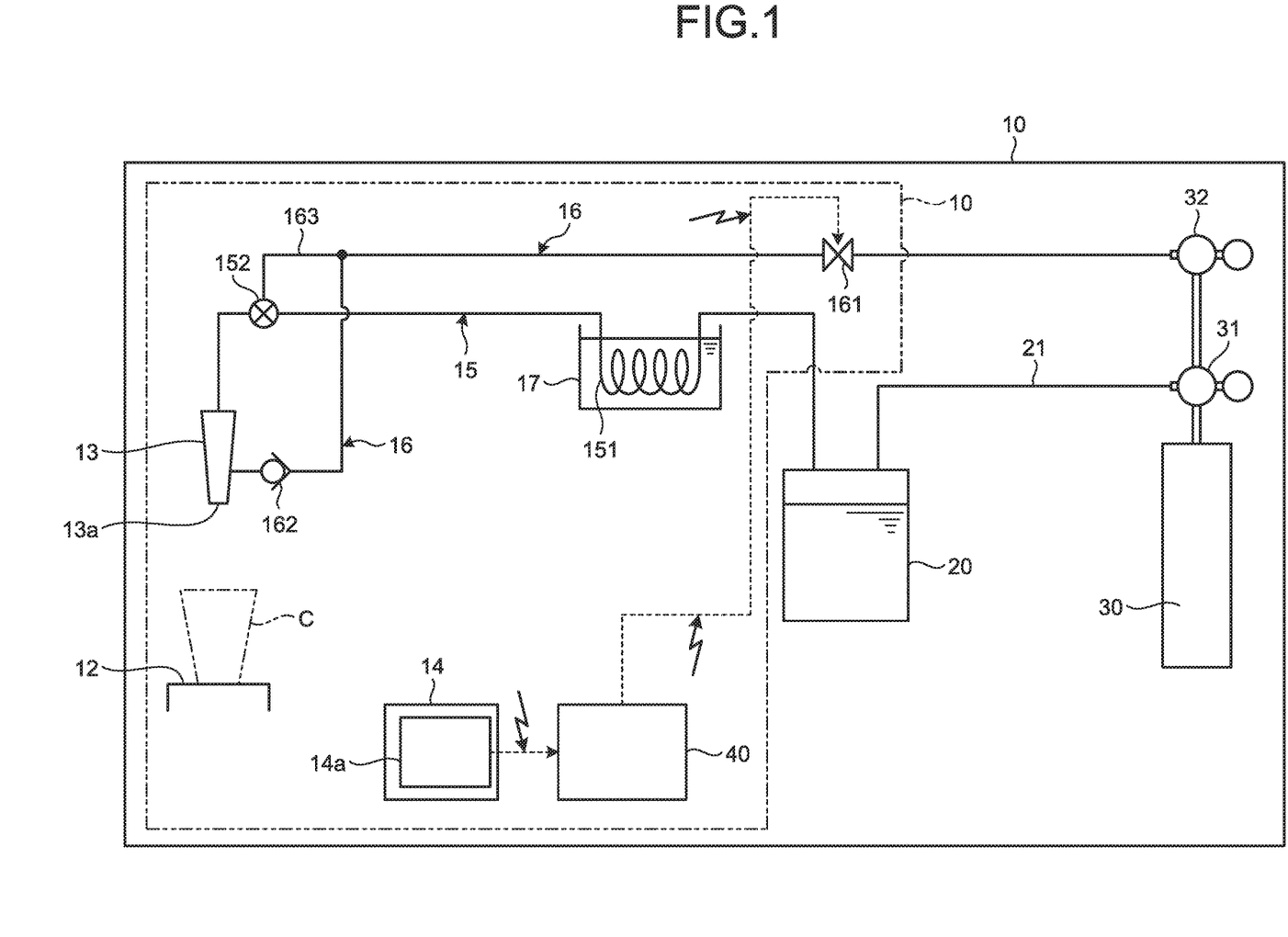
FIG. 1 is a diagram schematically illustrating a configuration of a beverage supplying apparatus according to an embodiment of the present disclosure.

FIG. 1 is a diagram schematically illustrating a configuration of a beverage supplying apparatus according to an embodiment of the present disclosure. A beverage supplying apparatus 1 of FIG. 1 is installed in, for example, a store, such as a convenience store, and includes an apparatus body 10 and a control unit 40.

Figure 2:
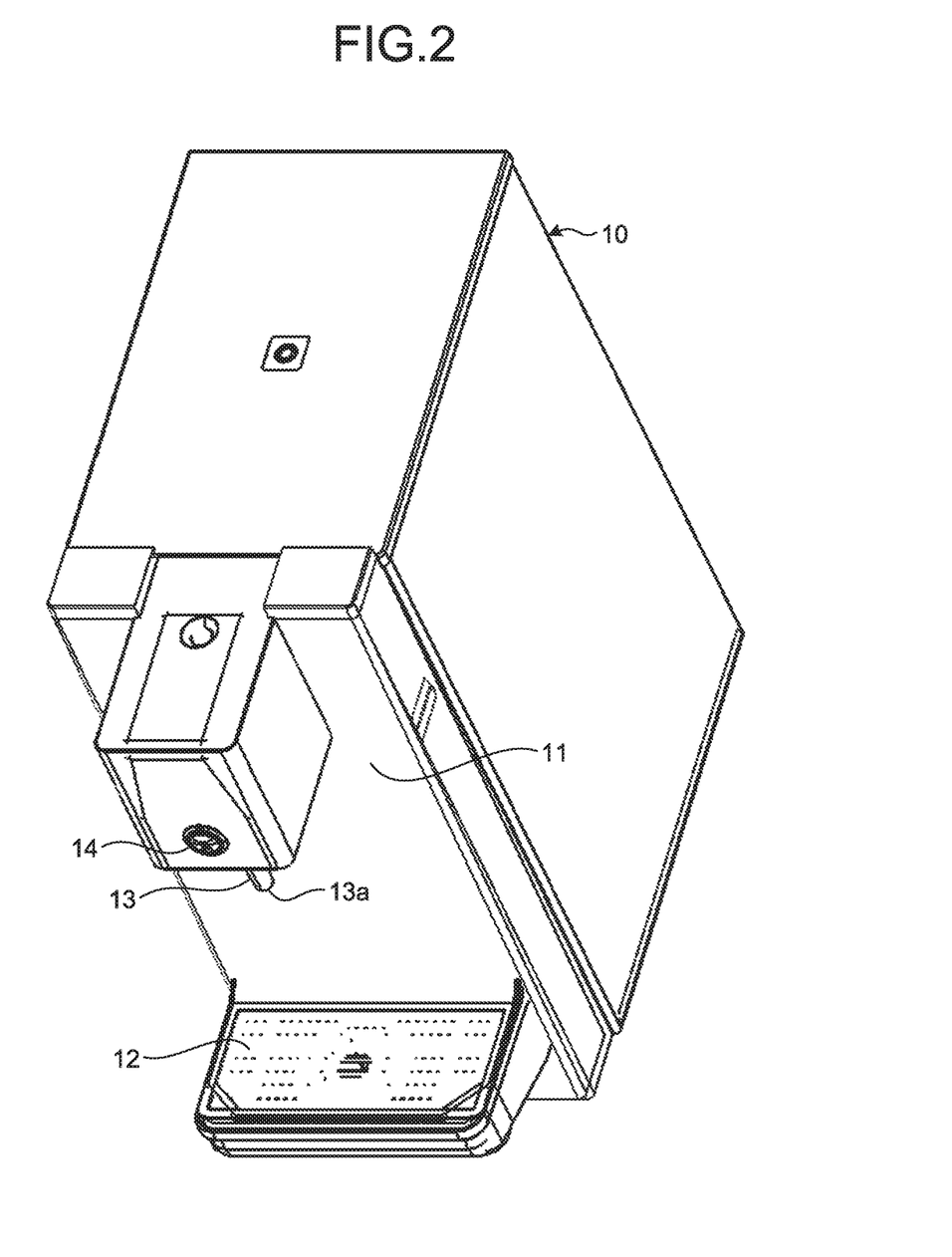
FIG. 2 is a perspective view of an apparatus body of FIG. 1.
Figure 3:
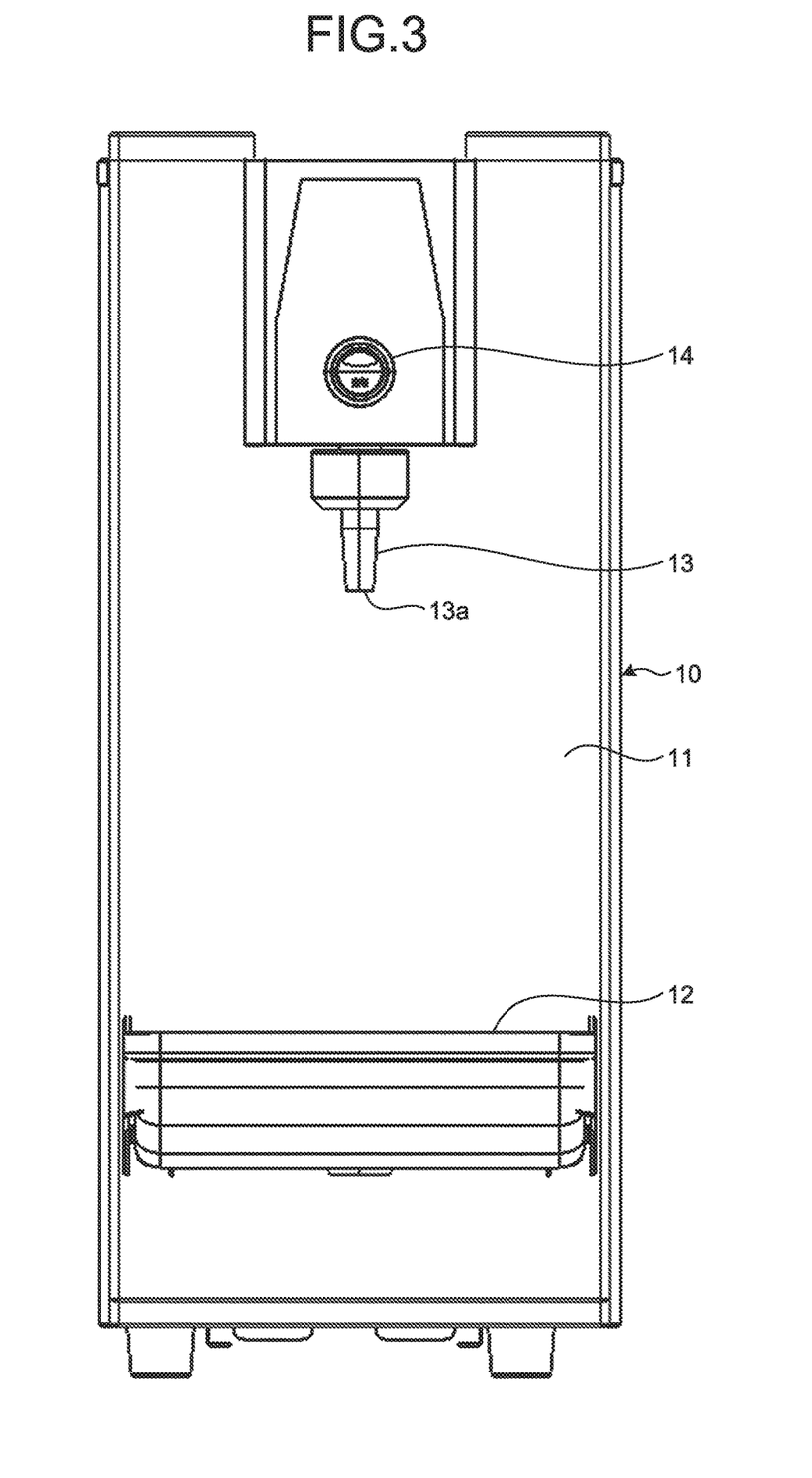
FIG. 3 is a front view illustrating the apparatus body of FIG. 1.
Figure 4:
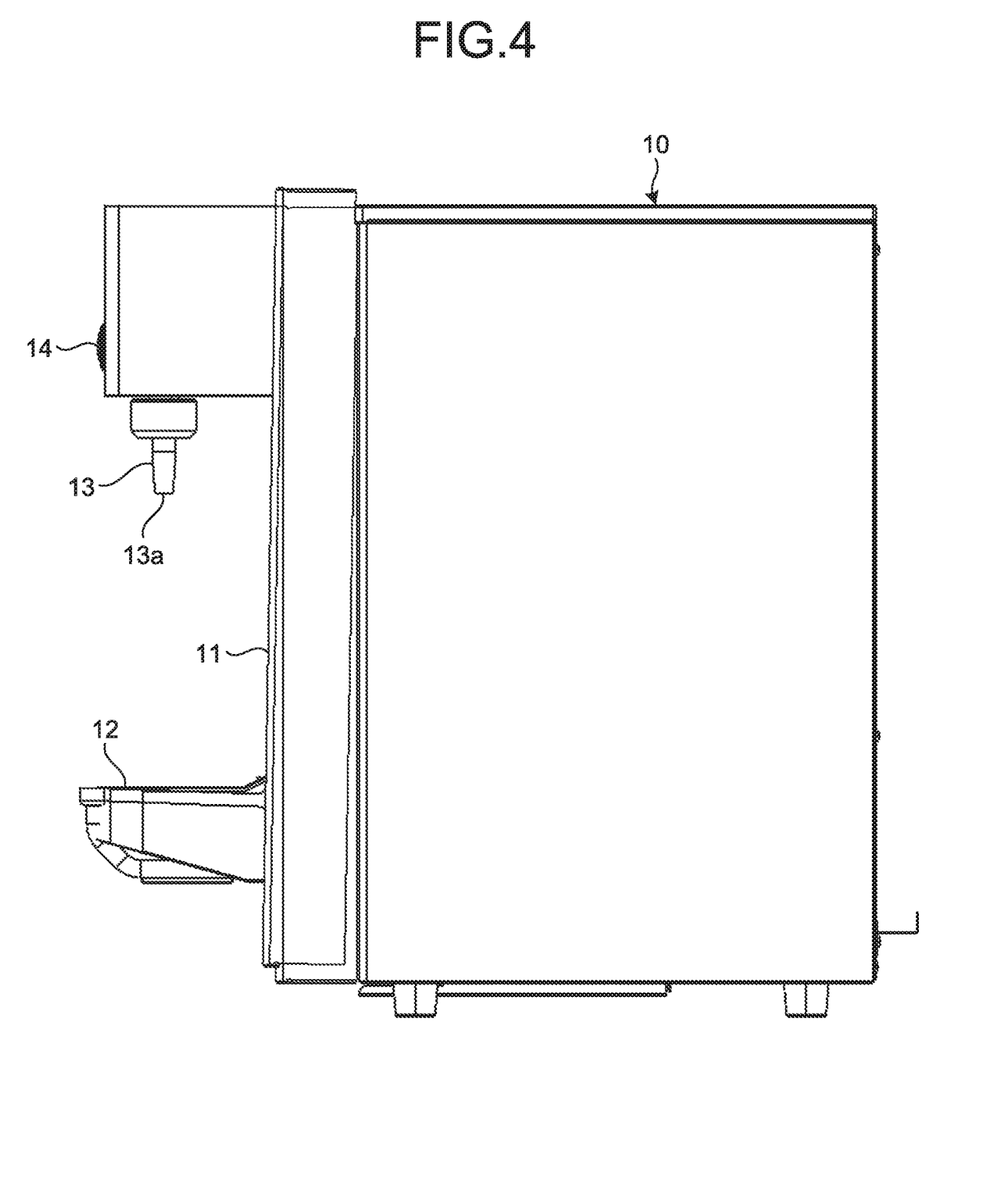
FIG. 4 is a side view illustrating the apparatus body of FIG. 1.

The apparatus body 10 is, as illustrated in FIG. 2 to FIG. 4, a rectangular-parallelepiped shaped housing, and has a front surface 11 forming a customer serving surface. On the front surface 11 of the apparatus body 10, there are provided a vending stage 12, a nozzle 13, and an operation button 14.

The vending stage 12 is a stage where a cup C serving as a beverage container is placed. The nozzle 13 is provided in a region above the vending stage 12. The nozzle 13 has a discharge port 13a provided in a lower end portion thereof facing the vending stage 12, and a beverage supplied to the nozzle 13 is discharged from the discharge port 13a into the cup C placed on the vending stage 12.

The operation button 14 is provided in a region above the nozzle 13. This operation button 14 is an operation input unit having a built-in switch 14a that is turned into an ON state so that a supply signal is sent out to the control unit 40 when the operation button 14 is operated to be pressed. That is, when the operation button 14 is being pressed, the switch 14a is in the ON state so that the supply signal is continuously sent out, and when the operation button is not being pressed, the switch 14a is in an OFF state so that the sending of the supply signal is stopped.

Figure 5:
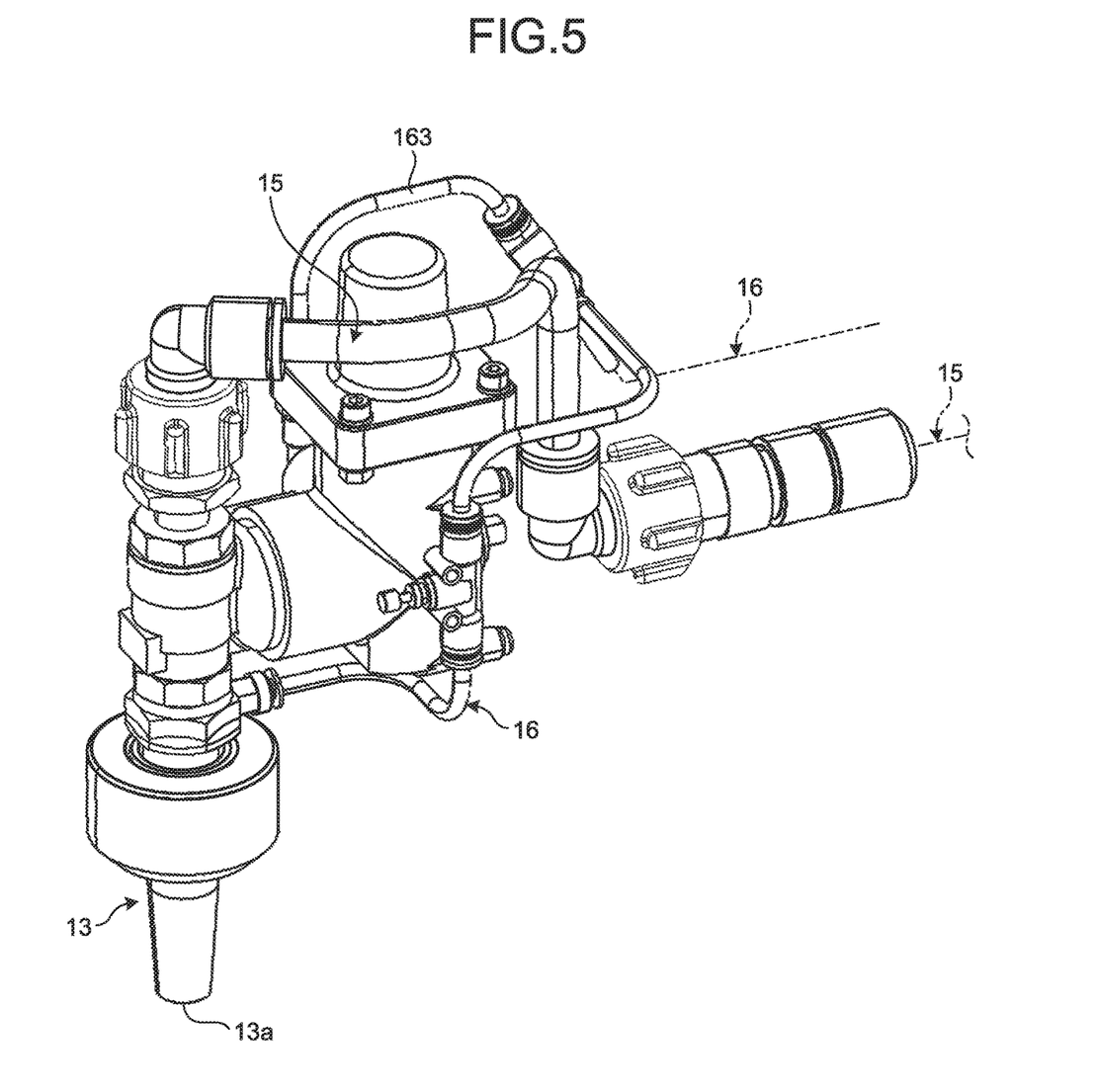
FIG. 5 is an enlarged perspective view illustrating a nozzle of FIG. 1 to FIG. 4, and a configuration around the nozzle.

As illustrated in FIG. 5, an extracted beverage supply line 15 and a nitrogen gas supply line 16 are connected to the nozzle 13.

The extracted beverage supply line 15 is formed of plural beverage supply pipes connected to each other, and is connected to an extracted beverage container (ingredient storage unit) 20 installed outside the apparatus body 10. The extracted beverage container 20 stores therein a beverage ingredient that is a low temperature extracted beverage (so-called cold brew coffee) extracted from ground coffee beans and water. That is, the extracted beverage supply line 15 is a route for the extracted beverage, which has been stored in the extracted beverage container 20, to be fed to the nozzle 13.

In the extracted beverage supply line 15, there are provided a cooling coil 151 and a supply valve 152. The cooling coil 151 refers to a cooling means that is provided in a manner that the cooling coil 151 is immersed in a cooling water vessel 17 installed in the apparatus body 10, and cools a fluid (the extracted beverage) passing through the cooling coil 151 to a predetermined temperature.

The supply valve 152 is formed of a so-called ball valve, and is provided at a position on the downstream side of the cooling coil 151, that is, a position closer to the nozzle 13 than the cooling coil 151. This supply valve 152 is formed of an openable and closable valve, allows passage of the fluid through the supply valve 152 to the nozzle 13 when the supply valve 152 is open, and prevent passage of the fluid through the supply valve 152 when the supply valve 152 is closed. The supply valve 152 is normally closed by a biasing force exerted by a biasing means (not illustrated).

A compressed gas supply pipeline 21, having one end connected to a gas cylinder 30 via a first pressure regulating valve 31, is connected to the extracted beverage container 20. The gas cylinder 30 stores therein nitrogen in a compressed state. Furthermore, the first pressure regulating valve 31 causes the nitrogen gas stored in the gas cylinder 30 to be fed at a predetermined pressure (for example, approximately 0.3 MPa to 0.5 MPa). Thereby, nitrogen gas is supplied to the extracted beverage container 20 via the compressed gas supply pipeline 21, and the extracted beverage is pressurized. Therefore, the pressurized extracted beverage is circulated to the supply valve 152 of the extracted beverage supply line 15, and is cooled on its way thereto by the cooling coil 151.

The nitrogen gas supply line 16 is formed of plural gas supply pipes connected to each other, and is connected to the gas cylinder 30 via a second pressure regulating valve 32. The second pressure regulating valve 32 causes the nitrogen gas, which has been stored in the gas cylinder 30, to be fed at a predetermined pressure (for example, approximately 0.3 MPa to 0.5 MPa).

A gas supply valve 161 is provided on this nitrogen gas supply line 16. The gas supply valve 161 is a valve that opens and closes according to commands given from the control unit 40. This gas supply valve 161 allows passage of the nitrogen gas through the gas supply valve 161 when the gas supply valve 161 is open, and prevents passage of the nitrogen gas through the gas supply valve 161 when the gas supply valve 161 is closed. A reference sign 162 in FIG. 1 denotes a check valve.

Furthermore, an operation gas supply pipeline 163 is branched from the nitrogen gas supply line 16 at a position on the downstream side of the gas supply valve 161, and the branched operation gas supply pipeline 163 is connected to the supply valve 152. This operation gas supply pipeline 163 is for supplying gas, which is necessary for operating the supply valve 152, to the supply valve 152. Thereby, the supply valve 152 is normally closed, but when nitrogen gas at a predetermined pressure is supplied to the supply valve 152 through the operation gas supply pipeline 163, the supply valve 152 is open against the biasing force exerted by the biasing means.

Figure 6:
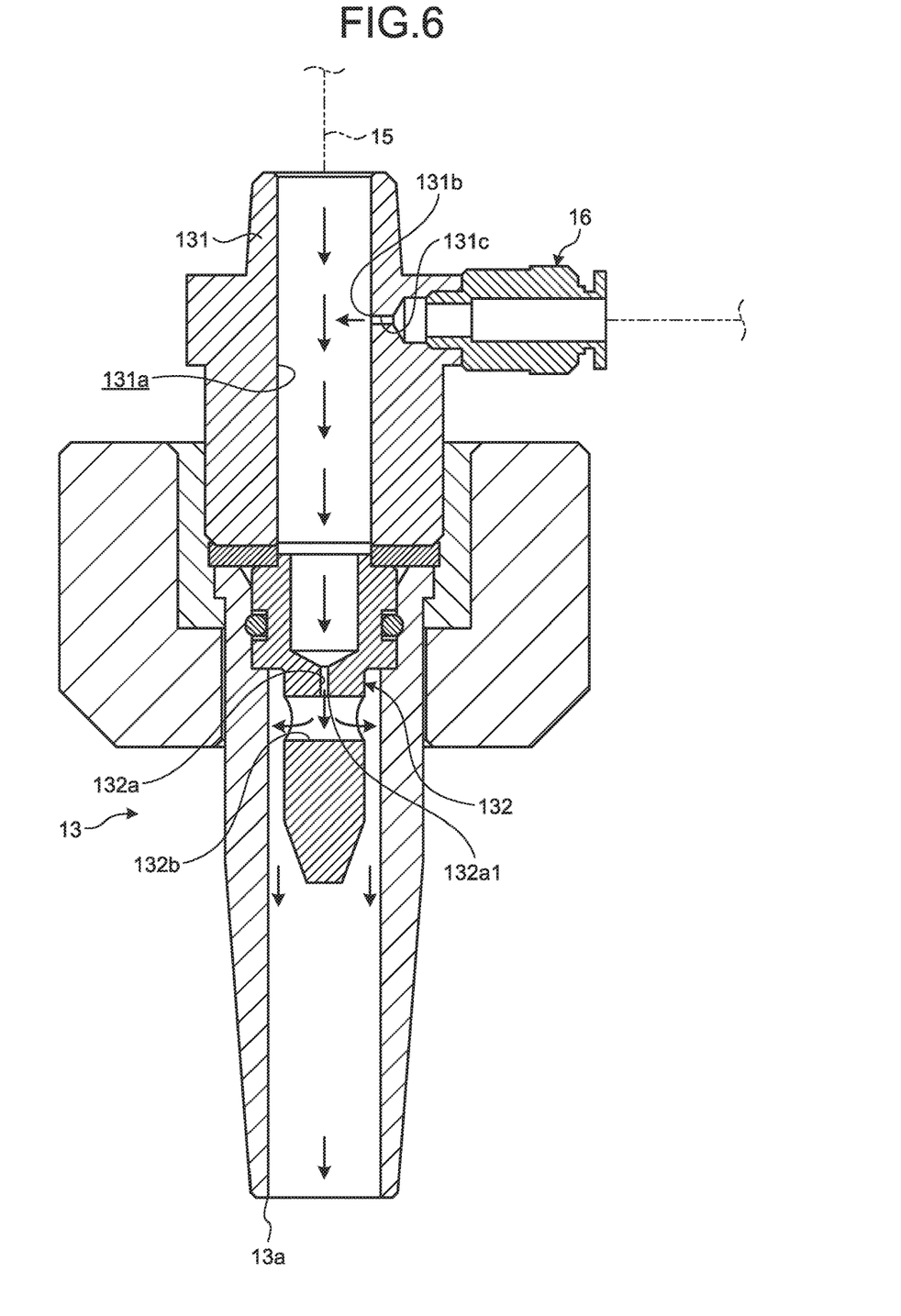
FIG. 6 is a longitudinal sectional view of the nozzle of FIG. 1 to FIG. 5.

FIG. 6 is a longitudinal sectional view of the nozzle 13 of FIG. 1 to FIG. 5. As illustrated in FIG. 6, this nozzle 13 includes, in addition to the discharge port 13a described above, a mixing unit 131 and a jetting unit 132.

The mixing unit 131 is an approximately cylindrical portion that mixes the extracted beverage, supplied through the extracted beverage supply line 15, with the nitrogen supplied through the nitrogen gas supply line 16. The mixing unit 131 is formed such that the extracted beverage flows from the top to the bottom in a hollow portion 131a thereof, and the nitrogen gas is discharged from a gas opening 131b formed in an inner wall surface thereof. A gas orifice 131c is formed at a portion communicating with the gas opening 131b, and has a diameter of, for example, approximately 1.0 mm. Due to the structure of the gas orifice 131c, the nitrogen gas discharged from the gas opening 131b is jetted at a predetermined flow velocity, and mixed and stirred with the extracted beverage.

The jetting unit 132 is provided on a lower side of the mixing unit 131, and has a beverage orifice 132a and a collision wall 132b. The beverage orifice 132a extends along a vertical direction such that its longitudinal direction extends along the vertical direction, and has a diameter of, for example, approximately 0.9 mm. The beverage orifice 132a depressurizes the nitrogen containing extracted beverage, having been mixed and stirred by the mixing unit 131, and jets out the depressurized nitrogen containing extracted beverage downward from a lower end exit 132a1 of the beverage orifice 132a. The collision wall 132b is provided to face the lower end exit 132a1 of the beverage orifice 132a, so that the nitrogen containing extracted beverage, jetted out from the lower end exit 132a1, collides with the collision wall 132b and is dispersed in a horizontal direction and dropped down to the discharge port 13a.

The control unit 40 integrally controls the operations of units in the beverage supplying apparatus 1. When the supply signal is sent out by the operation button 14, the control unit 40 determines that a supply command is given, and gives an opening command to the gas supply valve 161. The control unit 40 may be, for example: realized by a program being executed by, for example, a processing device such as a Central Processing Unit (CPU), that is, by software; realized by hardware, such as an Integrated Circuit (IC); or may be realized by use of both software and hardware.

When the beverage supplying apparatus 1 having such a configuration as described above is in a standby state, an extracted beverage, stored in the extracted beverage container 20, has been circulated through the extracted beverage supply line 15 by being pressurized by nitrogen gas, cooled by the cooling coil 151, and fed to the supply valve 152.

When the cup C is placed on the vending stage 12 and the operation button 14 is operated to be pressed from the standby state, the operation button 14 sends out a supply signal to the control unit 40. The control unit 40, having received the supply signal, gives an opening command to the gas supply valve 161. Thereby, the gas supply valve 161 is open, and nitrogen gas is supplied to the nozzle 13. When the nitrogen gas is supplied to the nozzle 13, some of the nitrogen gas passes through the operation gas supply pipeline 163 and is supplied as operation gas to the supply valve 152. Thereby, the supply valve 152 is open against the biasing force exerted by the biasing means, and the extracted beverage, having been cooled by the cooling coil 151, is supplied to the nozzle 13.

Nitrogen gas jetted out from the gas opening 131b comes into contact with the extracted beverage that passes through the mixing unit 131 of the nozzle 13 from the top to the bottom, and the extracted beverage and the nitrogen gas are thus mixed and stirred together. The nitrogen containing extracted beverage mixed and stirred as described above is depressurized by passing through the beverage orifice 132*a* in the jetting unit 132 of the nozzle 13, jetted out from the lower end exit 132*a*1, dispersed in the horizontal direction by colliding with the collision wall 132*b*, and brought into a foamy state. The foamy nitrogen containing extracted beverage is discharged from the discharge port 13*a* of the nozzle 13 and supplied, as a beverage, into the cup C.

Thereafter, the supply signal is stopped from being sent out when the pressing operation of the operation button 14 is canceled, so that the control unit 40 gives a closing command to the gas supply valve 161, and thereby the gas supply valve 161 is closed. As a result, the supply of the nitrogen gas to the nozzle 13 is stopped, the supply of the operation gas to the supply valve 152 is stopped, the supply valve 152 is closed, and the supply of the extracted beverage to the nozzle 13 is thereby stopped and the state is changed into the standby state.

In the above described beverage supplying apparatus 1 according to the embodiment, the compressed gas supply pipeline 21, the first pressure regulating valve 31, and the gas cylinder 30 constitute a compressed gas supplying means that supplies nitrogen gas (compressed gas) to the extracted beverage container (ingredient storage unit) 20 and pressurizes the extracted beverage (beverage ingredient).

Furthermore, the extracted beverage supply line 15, the supply valve 152, the nitrogen gas supply line 16, the second pressure regulating valve 32, the gas cylinder 30, the gas supply valve 161, and the control unit 40 constitute a beverage supplying means which allows the pressurized extracted beverage (beverage ingredient) to be supplied to the nozzle 13 and supplies the compressed nitrogen gas to the nozzle 13 when the supply command is given, and thereby mixes and stirs the nitrogen gas and beverage ingredient together at the nozzle 13 and causes the beverage to be discharged into the cup (beverage container) C through the nozzle 13.

In the above described beverage supplying apparatus 1, when the operation button 14 is operated to be pressed and the supply signal is given to the control unit 40, the gas supply valve 161 is open. Then, while the supply valve 152 is open and the extracted beverage is allowed to be supplied to the nozzle 13, nitrogen gas is supplied to the nozzle 13 so that the nitrogen gas and the extracted beverage are mixed and stirred together at the nozzle 13 and the nitrogen containing extracted beverage is discharged as a beverage into the cup C through the nozzle 13. Due to this, the nitrogen content in the beverage to be supplied into the cup C can be stabilized. As a result, generation of variation in appearance and flavor of the beverage supplied into the cup C can be reduced, and quality of the beverage supplied into the cup C can be stabilized.

According to the above described beverage supplying apparatus 1, since the cooling coil 151, provided on the extracted beverage supply line 15, cools the extracted beverage supplied to the nozzle 13 from the extracted beverage container 20, it is possible to increase the amount of nitrogen gas dissolved in the extracted beverage upon mixing and stirring with the nitrogen gas at the nozzle 13.

According to the above described beverage supplying apparatus 1, since the nozzle 13 causes the nitrogen gas and extracted beverage that have been mixed and stirred together to be depressurized and the mixture is collided with wall surface and discharged into the cup C, it is possible to supply the mixture into the cup C in a sufficiently foamy state.

According to the above described beverage supplying apparatus 1, since the nitrogen gas is supplied as compressed gas to the extracted beverage container 20, it is possible to increase the amount of nitrogen gas dissolved in the extracted beverage before the extracted beverage is supplied to the nozzle 13.

According to the above described beverage supplying apparatus 1, the pressurizing force of the nitrogen gas on the extracted beverage in the extracted beverage container 20 is substantially equal to the pressurizing force of the nitrogen gas in the nitrogen gas supply line 16, it is possible to mix and stir the extracted beverage and the nitrogen gas at the nozzle 13 in a good manner and supply a beverage into the cup C satisfactorily.

As described above, the preferred embodiment of the present disclosure has been described. However, it should be noted that the present disclosure is not limited to the above described embodiment, and various modifications may be made without departing from the scope of the present disclosure.

Figure 7:
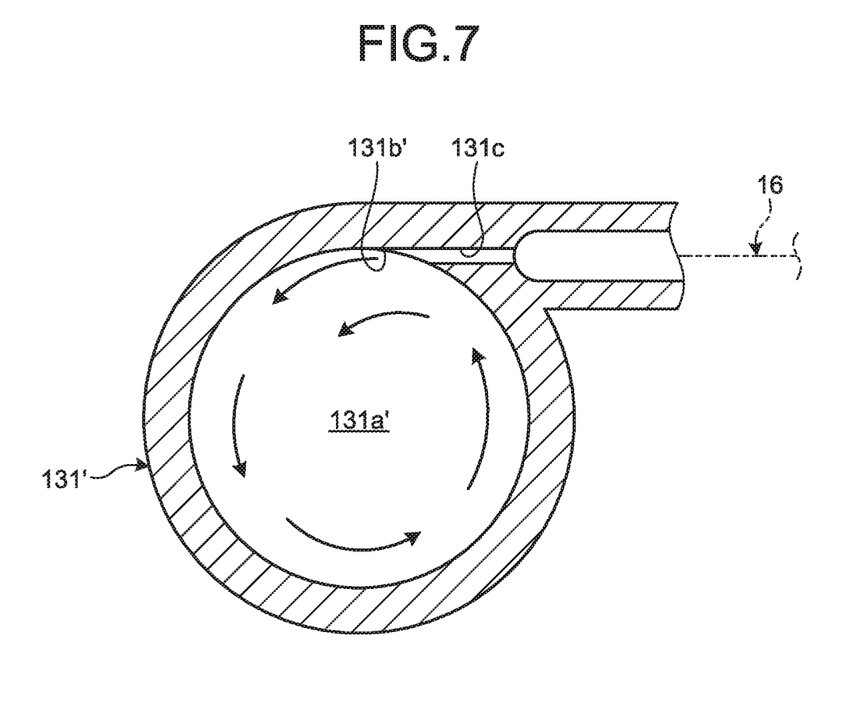
FIG. 7 is a transverse sectional view illustrating a main part of a modified example of the beverage supplying apparatus according to an embodiment of the present disclosure.

In the above described embodiment, a case is described where the gas opening 131*b* is provided at an arbitrary position on the inner wall surface of the mixing unit 131. However, according to the present disclosure, a gas opening 131*b'* may be provided, as illustrated in FIG. 7, along a tangential direction of a hollow portion 131*a'* forming a cylindrical shape in a mixing unit 131'. Thereby, nitrogen gas, jetted out from the gas opening 131*b'*, can be mixed and stirred with an extracted beverage while swirling along the inner wall surface of the hollow portion 131*a'*, and the amount of nitrogen gas dissolved in the extracted beverage can be increased.

In the above described embodiment, the number of the gas opening 131*b* is one. However, according to the present disclosure, plural gas openings may be provided.

In the above described embodiment, a case is described where a collision part of the nozzle 13 causes the nitrogen containing extracted beverage colliding with the collision wall 132*b* to be dispersed in the horizontal direction. However, according to the present disclosure, a beverage may be dispersed in any direction as long as the beverage, colliding with a collision wall, does not directly head to the discharge port.

According to the present disclosure, when the supply command is given, while the beverage supplying means allows a pressurized beverage ingredient to be supplied to a nozzle and supplies the compressed nitrogen gas to the nozzle, the beverage supplying means supplies the pressurized nitrogen gas to the nozzle. By doing this, the nitrogen gas and the beverage ingredient are mixed and stirred together in the nozzle and the beverage is discharged into the beverage container through the nozzle. As a result, an effect of enabling reduction of variation in appearance and flavor of the beverage supplied into the beverage container and stabilization of quality of the beverage supplied into the beverage container can be obtained.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A beverage supplying apparatus that supplies a beverage into a beverage container, the beverage supplying apparatus comprising:
   an ingredient storage unit configured to store a beverage ingredient;

a compressed gas supplying means configured to supply compressed gas to the ingredient storage unit and pressurize the beverage ingredient; and a beverage supplying means having a nozzle and configured to, when receiving a supply command, allow the pressurized beverage ingredient to be supplied to the nozzle, and supply compressed nitrogen gas to the nozzle, so that the nitrogen gas and the beverage ingredient are mixed and stirred at the nozzle creating a nitrogen gas containing extracted beverage which is discharged to the beverage container through the nozzle, wherein the nozzle includes a beverage orifice extending along a vertical direction, depressurizing the nitrogen gas containing extracted beverage and jetting out the depressurized nitrogen gas containing extracted beverage downward from a lower end exit of the beverage orifice, and a collision wall provided to face the lower end exit so that the nitrogen gas containing extracted beverage, jetted out from the lower end exit, collides with the collision wall and is dispersed in a horizontal direction and dropped down to a discharge port.

2. The beverage supplying apparatus according to claim 1, further comprising:

a cooling means configured to cool the beverage ingredient supplied to the nozzle from the ingredient storage unit.

3. The beverage supplying apparatus according to claim 1, wherein the compressed gas supplying means is configured to supply the compressed nitrogen gas to the ingredient storage unit.

4. The beverage supplying apparatus according to claim 1, wherein the nozzle causes the nitrogen gas, having been supplied to the nozzle, to be mixed and stirred with the beverage ingredient while causing the nitrogen gas to swirl along an inner wall surface of the nozzle.

5. The beverage supplying apparatus according to claim 1, wherein the beverage ingredient is a cold temperature extracted beverage that has been extracted from water and ground coffee beans.

6. The beverage supplying apparatus according to claim 1, wherein the nozzle further includes a mixing unit, from which the beverage orifice extends downwardly, for mixing the beverage ingredient and the compressed nitrogen gas, the beverage ingredient and the compressed nitrogen gas mixed in the mixing unit being ejected through the beverage orifice.

7. The beverage supplying apparatus according to claim 1, wherein the collision wall is spaced from the lower end exit of the beverage orifice so that the beverage ingredient and the compressed gas ejected from the lower end exit collide with the collision wall.

* * * * *